M. C. SCHWEINERT AND H. P. KRAFT.
PRESSURE GAUGE.
APPLICATION FILED AUG. 1, 1912. RENEWED JULY 14, 1921.
1,406,230.
Patented Feb. 14, 1922.
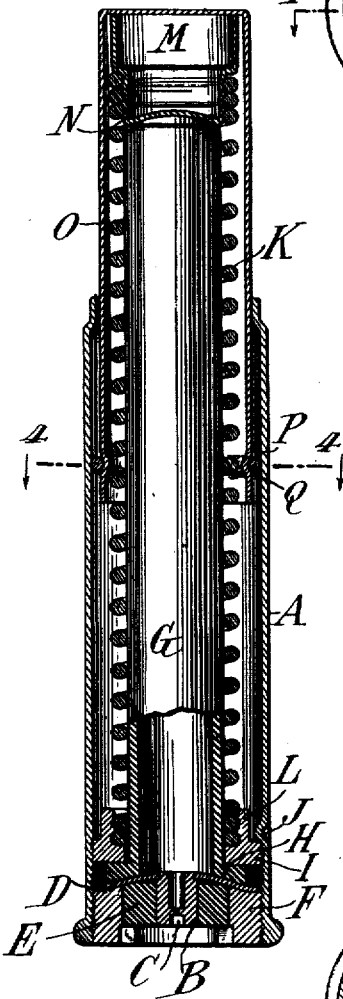
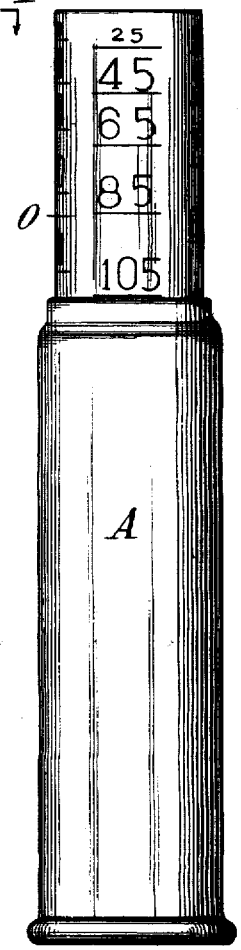
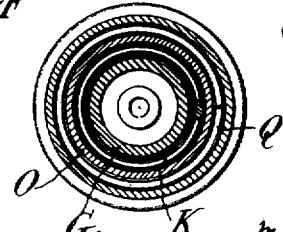

UNITED STATES PATENT OFFICE.

MAXIMILIAN CHARLES SCHWEINERT, OF NEW YORK, N. Y., AND HENRY PHILLIP KRAFT, OF RIDGEWOOD, NEW JERSEY.

PRESSURE GAUGE.

1,406,230.  Specification of Letters Patent.  Patented Feb. 14, 1922.

Application filed August 1, 1912, Serial No. 712,724. Renewed July 14, 1921. Serial No. 484,822.

*To all whom it may concern:*

Be it known that we, MAXIMILIAN CHARLES SCHWEINERT and HENRY PHILLIP KRAFT, both citizens of the United States, residing in New York, county and State of New York, and Ridgewood, in the county of Bergen and State of New Jersey, respectively, have invented certain new and useful Improvements in Pressure Gauges, of which the following is a specification.

This invention relates to pressure gauges, and aims to provide certain improvements therein.

The invention is particularly directed to a pressure gauge for pneumatic tires, which shall be of small and compact construction adapted to occupy the minimum space when not in use and also to be of such small dimensions that when extended in use it can be easily operated between the spokes of the ordinary automobile wheel wherein the space is restricted. A further object of the invention is to provide a construction in which the chance of leakage is reduced to the minimum, and wherein if leakage does occur the gauge will be rendered inoperative so that false indications are avoided. A still further object of the invention is to provide a gauge in which the movable or indicating member will be retained in its pressure indicating position after removal from the tire valve, so that the indicated pressures may be easily ascertained at the convenience of the user. The invention includes certain other features of improvement which will be hereinafter more fully described.

Referring to the drawings, which illustrate one form of the invention,

Figure 1 is a simple vertical section of the preferred form of gauge, a part of the inner tube being shown in elevation and the movable member being extended.

Fig. 2 is an elevation of Fig. 1.

Fig. 3 is an under side or bottom view of a gauge.

Fig. 4 is a cross-section of Fig. 1 taken on the line 4—4.

Referring to the drawings, let A indicate a suitable casing which constitutes the body of the gauge. At the lower part of the casing is provided a deflating projection B adapted to engage the stem of a tire valve and to force the same downwardly whereby to unseat the valve and permit air from the tire to rise within the gauge. The projection B is provided with a passage C for this purpose. The projection B may be secured in place in any suitable manner, but we have shown it as carried upon a perforated plate D. Surrounding the projection B is a packing washer E usually constructed of rubber and adapted to make a tight joint with the top of the valve shell. Surrounding the washer E is a screw-threaded collar F which is adapted to engage a suitable screw-thread formed on the inner side of the lower end of the casing A.

According to our invention the air, which is admitted into the gauge through the passage C, is led to a rubber tube G, which latter is closed at its upper end, preferably integrally as shown. The rubber tube G constitutes an expansible chamber which is adapted to expand in a longitudinal direction under a pressure of air within it. The bottom of the rubber tube G is preferably formed with a flange H which is shown as confined between a screw-threaded collar I and the plate D supporting the projection B. To limit the inward movement of the screw-threaded collar I we prefer to provide a stop J which is shown as a projection struck inwardly from the casing. A leak-tight joint is secured between the parts by the screw-threaded collar F which forces the plate D inwardly, thus clamping the flange H against the collar I.

For the purpose of loading the gauge we preferably provide an expansion spring K, which is secured at one end to a flange L formed on the upper side of the collar I, the latter being preferably screw-threaded or otherwise formed to receive the bottom of the spring. The upper end of the spring K is fastened to a movable member M which is preferably constructed as a cup formed of sheet metal, having a lower projecting portion N, the outer wall of which is screw-threaded or otherwise suitably formed to engage the upper end of the spring.

We prefer to utilize as an indicating member a sleeve O which is adapted to telescope when in the casing, its normal position being preferably with its upper end approximately flush with the top of the casing. The sleeve O is preferably disconnected from the spring K, member M and tube G, although for certain purposes it may be connected therewith. In the preferred form of the invention, however, as the tube G is expanded under the pressure of the air within it, the member M presses against the under side of the top of the sleeve O and raises the sleeve to a position corresponding to the pressure within the tire. In the construction shown the sleeve is provided with a suitable scale indicating in points the pressure reached. The lower end of the sleeve is provided with a groove P in which is confined a friction ring Q which is adapted to bear outwardly against the inner side of the casing A and sustain the sleeve in any position to which it may be moved.

In the use of the construction shown the device is pressed on the top of the tire valve, the packing E making a leak-tight joint and the projection B depressing the valve stem, thereby opening the valve and permitting air to flow through the passage C into the expansible tube G, thus extending the latter and raising the sleeve O to a position corresponding to the pressure within the tire. During this operation no attention need be paid to the sleeve as the latter will maintain its position after the gauge is removed from the tire valve so that the indications may be read at leisure. When the gauge is removed from the valve, the pressure within the expansible tube G is released and the latter, with its movable member M, returns to its normal or zero position. After the indications are read it is necessary only to depress the indicating sleeve by hand before the device is again used.

The gauge as thus constructed presents various important improvements. The elongated expansible sleeve G constitutes in effect what may be termed a continuation of the air tube of the tire. In other words, leakage in the gauge so long as the rubber sleeve remains intact, is impossible. The difficulty occasioned by the use of piston packings or similar devices is hence avoided. Furthermore, if the extensible sleeve should by any chance become perforated, air will escape rapidly through it and the gauge in most cases show no indication whatever. In the case of piston packings leakage is very frequently due to deterioration of the packing, or other causes, and this leakage sometimes is very slight so that the gauge makes an indication which is less than the actual pressure in the tire. Or if the piston packing should become gummy by the use of a lubricant or for other reasons, the gauge is apt to under indicate. In the present construction of gauge the spring K is preferably so proportioned with relation to the extensible sleeve, that it expands substantially uniformly with the extensible sleeve. There is hence very little slip or friction between the parts and if any exists, it is practically uniform. No lubricant is used and the gauge hence has a durability and uniformity of action which is not obtained in other types of gauge. A further improvement is the provision of a gauge wherein the utmost compactness is obtained consistent with proper length of spring. The figures of the drawing are shown as considerably enlarged, the gauges in actual practice being much reduced in size. This compactness is obtained partly from the fact that the lower end of the spring is fixed to the casing near the bottom thereof and the upper end bears against the indicating member close to the top of the latter. Furthermore the indicating sleeve, being hollow, serves as a guide for the spring and extensible tube when the latter extend above the casing in use. For this means it is necessary to make the casing only long enough to enclose the parts when the gauge is in its zero position. Furthermore, when the gauge is in such a position all of the moving parts are enclosed in the casing, or substantially so, so that all such parts are protected. By this construction the gauge may be subjected to very rough usage without liability of injury. This is particularly desirable for use in connection with automobiles or bicycles, wherein the gauge is usually carried in a tool-box and is subject to very rough usage.

It will be understood that while we have shown in detail one form of the invention, the invention is not limited thereto, as various changes can be made therein without departing from the invention. The indicating sleeve may be arranged in any suitable manner with respect to the casing, but I prefer the construction shown since the indicating sleeve is better protected and forms a better guide for the spring and tube.

Claims to the broad features of the invention herein shown and described are not made herein, but are to be found in our application, Serial No. 552,111, filed March 28, 1910.

What is claimed is:—

1. A pressure gauge comprising an elongated casing, an indicating sleeve sliding along said casing, means for positioning the sleeve including an extensible tube having its lower end connected with the casing and its upper end extending within said sleeve, and a spring surrounding said tube and adapted to oppose expansion of said tube, said sleeve and tube being disconnected.

2. A pressure gauge comprising an elongated casing, an indicating sleeve sliding along said casing, means for positioning the sleeve including an extensible tube having its lower end connected with the casing and its upper end extending within said sleeve to a point near the top thereof, a spring adapted to oppose expansion of said tube, said sleeve being disconnected from said tube.

3. A pressure gauge comprising an indicating sleeve, a tubular casing within which said sleeve slides, said casing adapted to permit extension of the sleeve beyond the casing in use, means for positioning the sleeve including an extensible tube having its lower end connected to said casing and having its upper end extended within said sleeve, and a spring surrounding said extensible tube and adapted to oppose expansion of said tube, the sleeve being disconnected from the tube and spring.

4. A pressure gauge comprising an elongated casing, an indicating sleeve sliding along said casing, means for positioning the sleeve including an extensible tube having its lower end connected with the casing and its upper end extending within said sleeve, and a spring surrounding said tube and adapted to oppose expansion of said tube, said tube and spring being normally disconnected from said sleeve, and means for holding said sleeve in its indicating position.

5. A pressure gauge comprising a tubular casing, and a sliding sleeve adapted to project from and retire within said casing, an extensible tube connected to said casing at its lower end and projecting within said sleeve at its upper end, a movable member engaged by the upper end of said tube, and a spring connected at one end to the lower end of said casing and at the other end to said movable member, and said movable member being adapted to move said sleeve in one direction only.

6. A pressure gauge comprising a tubular casing, and a sliding sleeve adapted to project from and retire within said casing, an extensible tube connected to said casing at its lower end and projecting within said sleeve at its upper end, a movable member engaged by the upper end of said tube and adapted to actuate said sleeve, and a spring connected at one end to the lower end of said casing and at the other end to said movable member, said movable member, tube and spring being disconnected from said sleeve, whereby the former may be retracted without retracting said sleeve.

7. A pressure gauge comprising a tubular casing, and a sliding sleeve adapted to project from and retire within said casing, an extensible tube connected to said casing at its lower end and projecting within said sleeve at its upper end, a movable member engaged by the upper end of said tube and adapted to actuate said sleeve, and a spring connected at one end to the lower end of said casing and at the other end to said movable member, said movable member, tube and spring being disconnected from said sleeve, whereby the former may be retracted without retracting said sleeve, and means for frictionally holding said sleeve in any position to which it may be moved by the pressure.

8. A pressure gauge comprising a tubular casing, a thin metal sleeve sliding within said casing and having a friction means for holding it in its varying positions, an extensible tube connected at its lower end to the lower end of said casing, and having its upper end extended within said sleeve to a point near the top thereof, a spring surrounding said extensible tube, a movable member above said tube to which the upper end of said spring is connected, and means for connecting the lower end of said spring to the lower end of said casing, said movable member bearing against the top of said sleeve, and being disconnected therefrom whereby the movable member may be retracted without retracting said sleeve.

9. A pressure gauge comprising a casing, a collar within said casing, an extensible tube having an angular flange bearing against said collar, means for depressing a tire valve bearing against said flange, and a screw-threaded collar bearing against said means.

10. A pressure gauge comprising a casing, a collar within said casing, an extensible tube having an angular flange bearing against said collar, means for depressing a tire valve bearing against said flange, and a screw-threaded collar bearing against said means, a packing washer surrounding said means, an indicating member and means whereby the same is moved in accordance with the expansion of said tube.

11. A pressure gauge comprising a tubular casing having a screw thread at its lower end, a screw-threaded collar, fitting the screw-threads of the casing, an extensible tube having a flange fitting against said collar, and a screw-threaded member pressing said flange against said collar.

12. A pressure gauge comprising a tubular member having an interior screw thread at its lower end, a screw-threaded collar fitting said screw thread, said collar having means for attachment to a spring, an extensible tube having a flange fitting against said collar, a disc below said collar and bearing against the flange, a deflating projection carried by said disc, a packing surrounding said projection, and a screw-threaded collar bearing against said disc.

13. A pressure gauge comprising an elongated casing, an indicating sleeve slidable along said casing, and means for positioning the sleeve including an expansible tube having its lower end connected with the casing and its upper end extending within said sleeve, said tube being disconnected from said sleeve, and means for holding said sleeve in its extended positions when the tube is contracted by releasing the air pressure within it.

14. A pressure gauge comprising an elongated casing, an indicating sleeve slidable within said casing, and projecting beyond the end of said casing when in indicating positions, and means for positioning the sleeve including an expansible tube having its lower end connected with the casing and its upper end extending within said sleeve, said tube being disconnected from said sleeve, and means for holding said sleeve in its extended positions when the tube is contracted by releasing the air pressure within it.

15. A gauge for ascertaining the air pressure in applied inflated tires, comprising a movable pressure indicating element with means for retaining the element in pressure indicating position, a press-on seat for engaging the tire valve casing, a tire valve unseating element adapted to operate upon the application of the gauge to the tire valve casing, and operating means for causing the movement of the indicating element upon the unseating of the tire valve, said operating means comprising an extensible tube disconnected from said indicating element.

16. A gauge for ascertaining the air pressure in applied inflated tires, comprising a movable pressure indicating element with means for retaining the element in pressure indicating position, a press-on seat for engaging the tire valve casing, a tire valve unseating element adapted to operate upon the application of the gauge to the tire valve casing, and operating means for causing the movement of the indicating element upon the unseating of the tire valve, said indicating element comprising a slidable sleeve and said operating means comprising an extensible tube extending into and disconnected from said indicating sleeve.

17. A gauge for ascertaining the air pressure in applied inflated tires, comprising a movable pressure indicating element with means for retaining the element in pressure indicating position, a press-on seat for engaging the tire valve casing, a tire valve unseating element adapted to operate upon the application of the gauge to the tire valve casing, and operating means for causing the movement of the indicating element upon the unseating of the tire valve, said indicating element comprising a slidable sleeve and said operating means comprising an extensible tube extending into and disconnected from said indicating sleeve, and a spring operating in conjunction with said extensible tube.

18. A gauge for ascertaining the air pressure in applied inflated tires, comprising a movable pressure indicating element with means for retaining the element in pressure indicating position, a press-on seat for engaging the tire valve casing, a tire valve unseating element adapted to operate upon the application of the gauge to the tire valve casing, and operating means for causing the movement of the indicating element upon the unseating of the tire valve, said indicating element comprising a slidable sleeve and said operating means comprising an extensible tube extending into and disconnected from said indicating sleeve and a coil spring surrounding and operating in conjunction with said extensible tube.

In witness whereof we have hereunto signed our names in the presence of two subscribing witnesses.

MAXIMILIAN CHARLES SCHWEINERT.
HENRY PHILLIP KRAFT.

Witnesses:
HENRY M. TURK,
FRED WHITE.